US012695238B2

(12) United States Patent
Krah et al.

(10) Patent No.: US 12,695,238 B2
(45) Date of Patent: Jul. 28, 2026

(54) CABLE PROTECTION COVER FOR INCREASING PULL-OUT RESISTANCE

(71) Applicants: TE Connectivity India Private Limited, Bangalore (IN); TE Connectivity Germany GmbH, Bensheim (DE)

(72) Inventors: Thorsten Krah, Speyer (DE); Hamdi Karabiyik, Speyer (DE); Kiranpal Singh, Bangalore (IN); Udo Langjahr, Speyer (DE); Jens Keller, Speyer (DE); Florian Eichinger, Speyer (DE); Mohammed Hanie El Moussati, Bensheim (DE); Dimitrios Farkatsis, Bensheim (DE)

(73) Assignees: TE Connectivity Germany GmbH, Bensheim (DE); TE Connectivity India Private Limited, Bangalore (IN)

( * ) Notice: Subject to any disclaimer, the term of this patent is extended or adjusted under 35 U.S.C. 154(b) by 888 days.

(21) Appl. No.: 17/960,349

(22) Filed: Oct. 5, 2022

(65) Prior Publication Data

US 2023/0104418 A1 Apr. 6, 2023

(30) Foreign Application Priority Data

Oct. 5, 2021 (IN) .............................. 202141045246

(51) Int. Cl.
| | |
|---|---|
| *H01R 13/58* | (2006.01) |
| *H01R 13/639* | (2006.01) |
| *H02G 3/04* | (2006.01) |

(52) U.S. Cl.
CPC ..... *H01R 13/5812* (2013.01); *H01R 13/5833* (2013.01); *H01R 13/639* (2013.01); *H02G 3/0468* (2013.01)

(58) Field of Classification Search
CPC . H01R 13/5812; H01R 13/5833; H01R 13/44
See application file for complete search history.

(56) References Cited

U.S. PATENT DOCUMENTS

| | | | | |
|---|---|---|---|---|
| 5,338,211 A * | 8/1994 | Kodama | .............. | H01R 13/639 |
| | | | | 439/367 |
| 6,568,967 B2 * | 5/2003 | Inaba | ................. | H01R 13/5213 |
| | | | | 439/906 |

(Continued)

FOREIGN PATENT DOCUMENTS

| | | |
|---|---|---|
| CN | 101673902 A | 3/2010 |
| CN | 101765946 A | 6/2010 |

(Continued)

OTHER PUBLICATIONS

Korean Office Action dated Nov. 19, 2024 with English translation, corresponding to Application No. 10-2022-0127015, 9 pages.

(Continued)

*Primary Examiner* — Neil Abrams
(74) *Attorney, Agent, or Firm* — Barley Snyder

(57) ABSTRACT

A cable protection cover includes a housing attachment section securing the cable protection cover to a housing of an electrical device and receiving an electric connector attached to the housing. The housing attachment section has a connector lock with a locking member restraining the electric connector in a pull-out direction in a position in which the electric connector is attached to the housing.

19 Claims, 8 Drawing Sheets

(56) References Cited

U.S. PATENT DOCUMENTS

| | | | | |
|---|---|---|---|---|
| 6,878,009 B2 * | 4/2005 | Amemiya | .......... | H01R 13/5812 |
| | | | | 439/470 |
| 6,971,905 B2 * | 12/2005 | Makita | ................. | H02G 3/0691 |
| | | | | 439/587 |
| 7,955,115 B2 | 6/2011 | Morino et al. | | |
| 8,062,051 B2 | 11/2011 | Ngo | | |
| 8,568,159 B2 * | 10/2013 | Noda | ................... | H01R 13/562 |
| | | | | 439/470 |
| 9,831,624 B2 * | 11/2017 | Garvey | .................. | H01R 24/30 |
| 10,696,246 B2 * | 6/2020 | Nagasawa | .......... | H01R 13/5812 |
| 11,605,918 B2 * | 3/2023 | Liniger | ................. | H02G 15/04 |

FOREIGN PATENT DOCUMENTS

| | | | |
|---|---|---|---|
| CN | 103199359 A | 7/2013 |
| CN | 109524836 A | 3/2019 |
| JP | H557776 U | 7/1993 |
| JP | H9223545 A | 8/1997 |
| JP | 2008159544 A | 7/2008 |
| WO | 2013106495 A1 | 7/2013 |

OTHER PUBLICATIONS

Japanese Office Action dated Aug. 22, 2023 with English translation, corresponding to Application No. 2022-157361, 11 pages.
Chinese Office Action dated Apr. 20, 2026 with English translation, corresponding to Application No. 202211195453.5, 16 pages.

* cited by examiner

CABLE PROTECTION COVER FOR INCREASING PULL-OUT RESISTANCE

CROSS-REFERENCE TO RELATED APPLICATIONS

This application claims the benefit of the filing date under 35 U.S.C. § 119(a)-(d) of India Patent Application No. 202141045246, filed on Oct. 5, 2021.

FIELD OF THE INVENTION

The invention relates to electrical devices, such as sensors, actuators, displays and electronic control units, and the attachment of electric cables thereto.

BACKGROUND

There is a trend that electrical devices are becoming increasingly smaller. This miniaturization requires smaller housings and consequently smaller electric connectors for power supply and/or data transmission. A problem associated with this miniaturization is that the pull-out forces necessary to detach the electric cables and connectors from the housings of the electrical devices are often very small and might not comply with the relevant safety regulations.

SUMMARY

A cable protection cover includes a housing attachment section securing the cable protection cover to a housing of an electrical device and receiving an electric connector attached to the housing. The housing attachment section has a connector lock with a locking member restraining the electric connector in a pull-out direction in a position in which the electric connector is attached to the housing.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
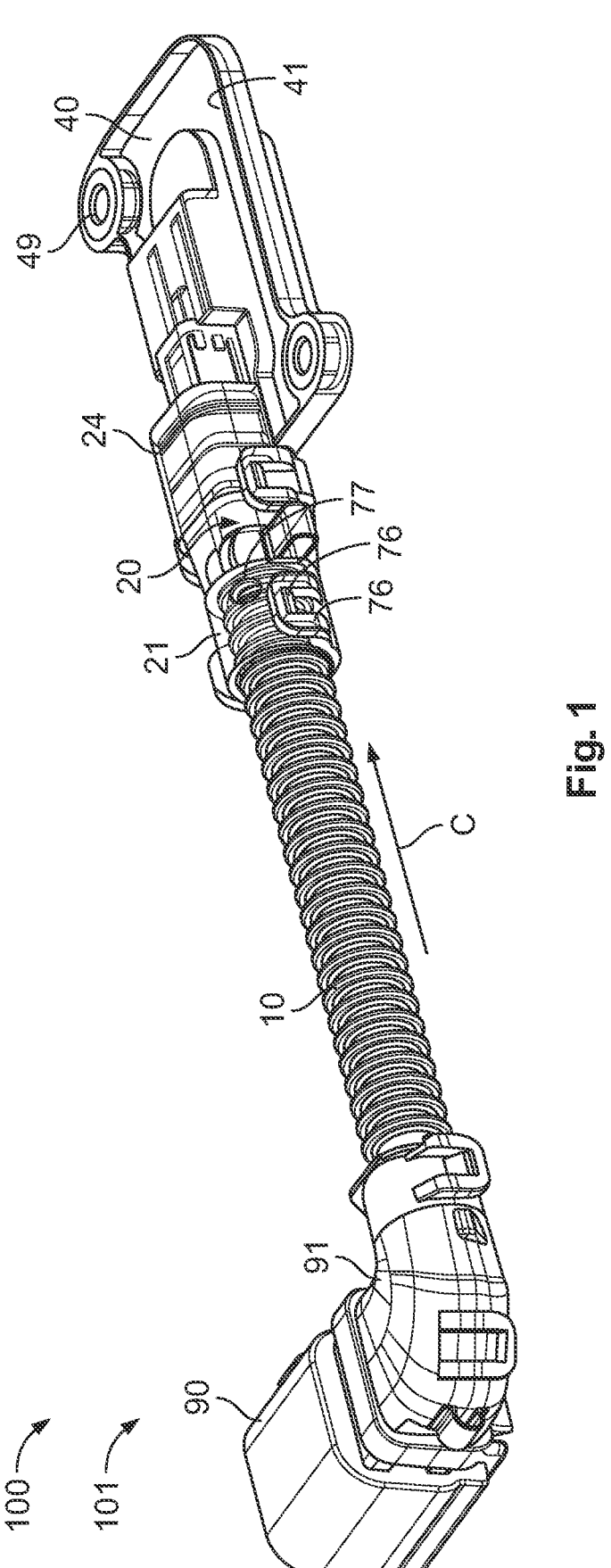
FIG. 1 is a perspective view of an assembly with a first embodiment of a cable protection cover.

The invention will now be described in greater detail and in an exemplary manner using embodiments and with reference to the drawings. The described embodiments are only possible configurations in which, however, the individual features as described herein can be provided independently of one another or can be omitted.

The drawings show exemplary embodiments of the inventive cable protection cover and assembly, wherein like reference numerals refer to like elements. The invention may, however, be embodied in many different forms and should not be construed as being limited to the embodiments shown in the drawings and described below. These embodiments are rather provided so that the present disclosure conveys the concept of the invention to those skilled in the art.

Figure 2:
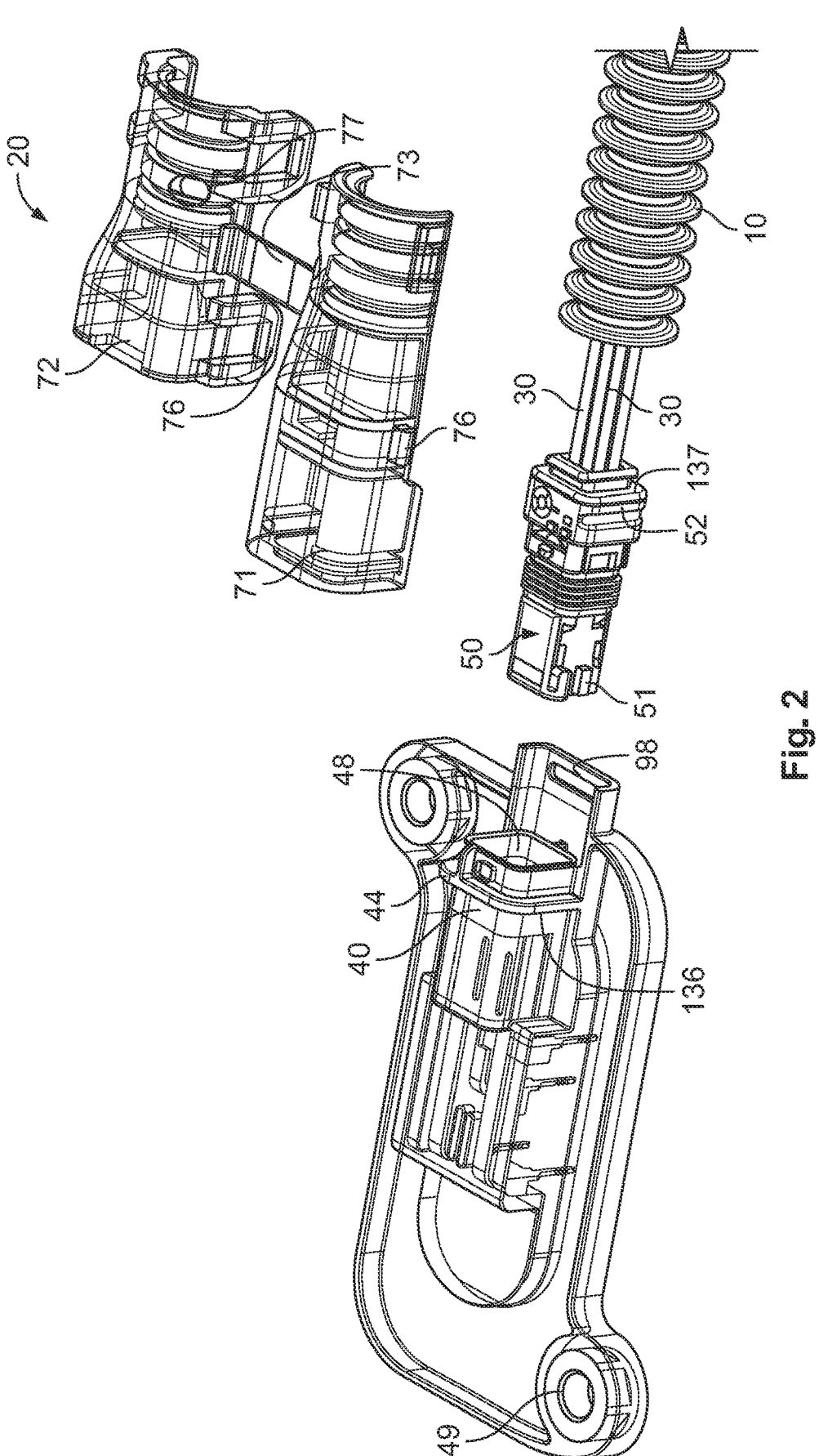
FIG. 2 is an exploded perspective view of the assembly.
Figure 3:
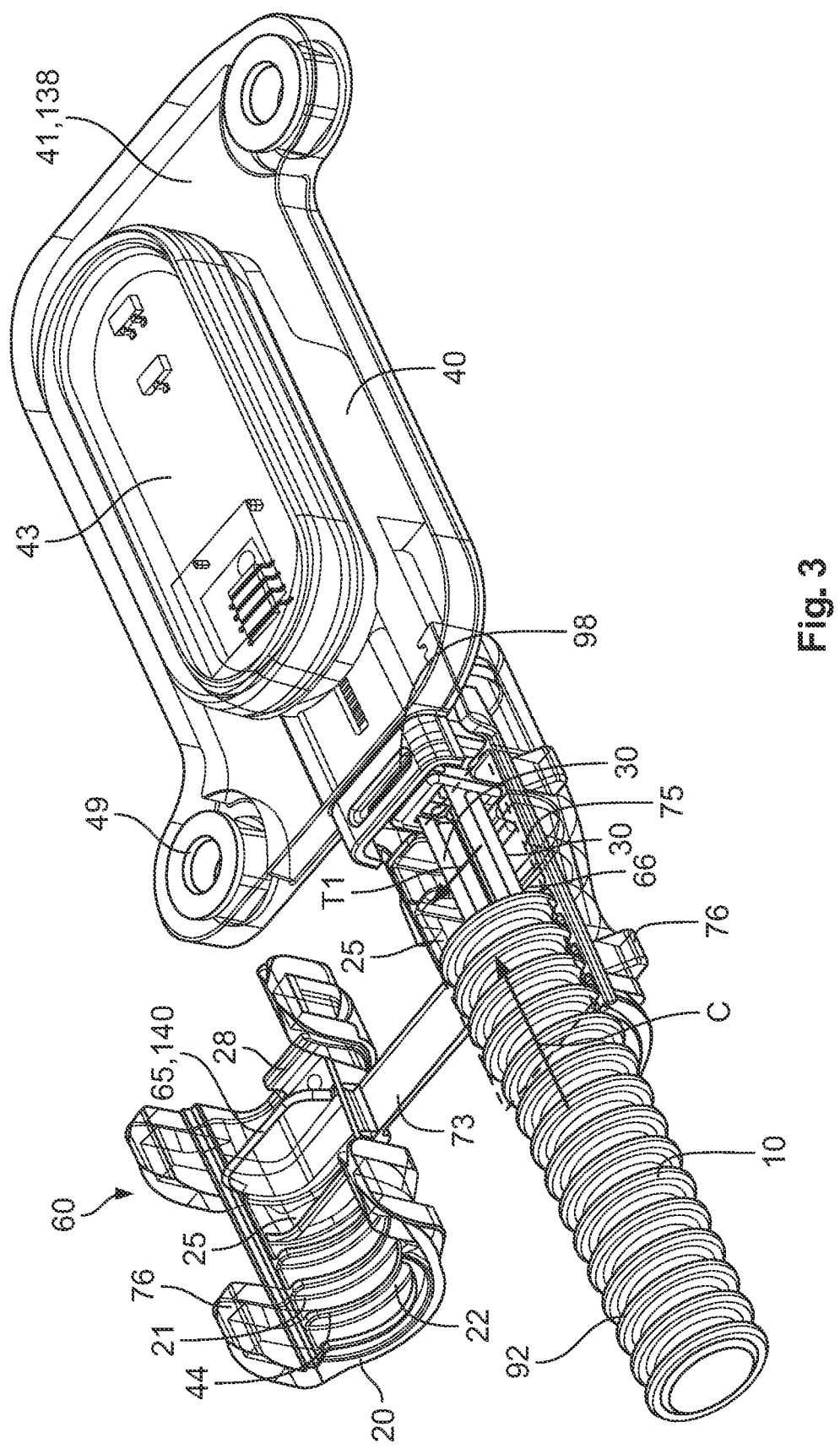
FIG. 3 is a perspective view of the assembly during a mounting step.
Figure 4:
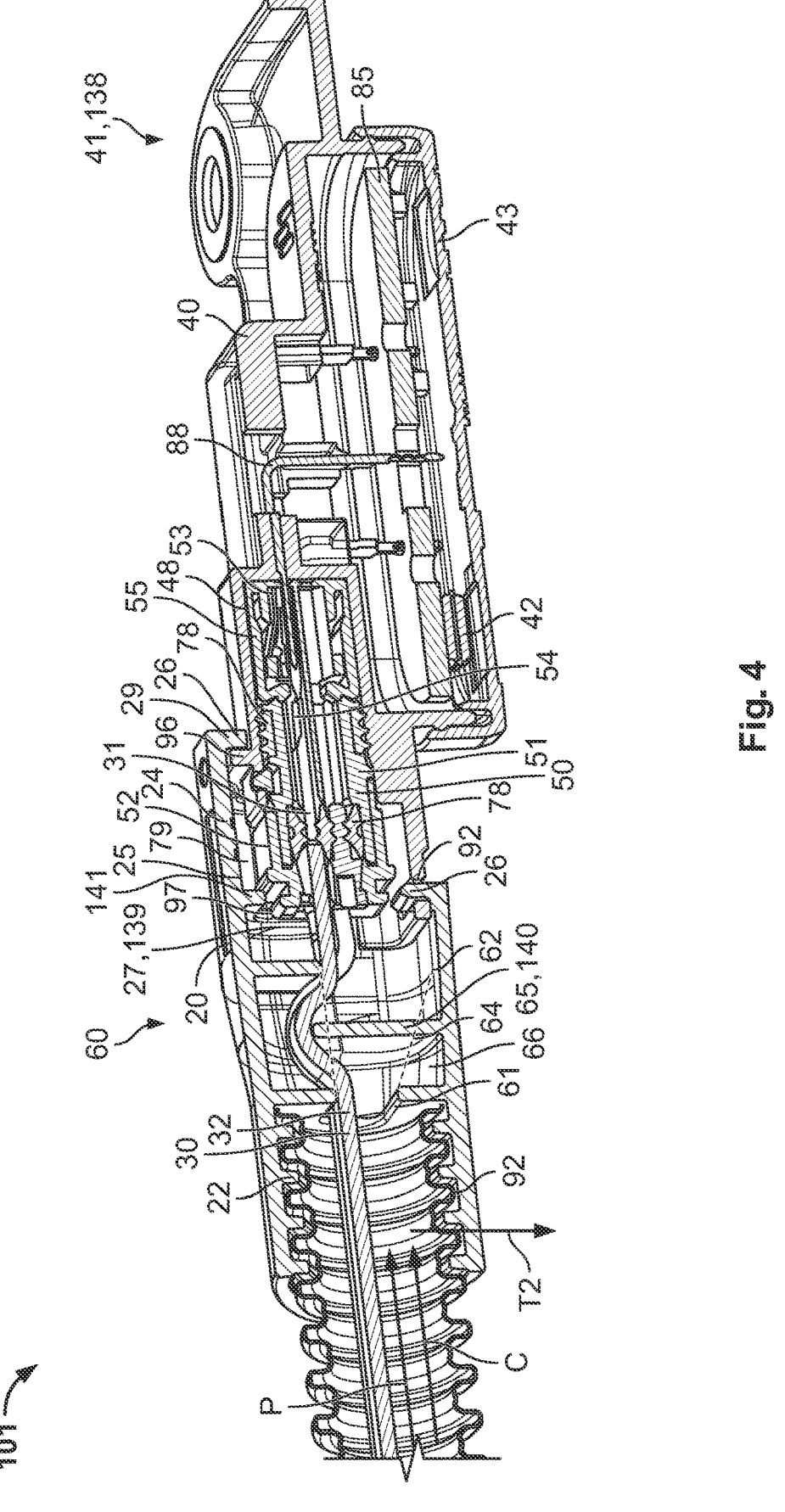
FIG. 4 is a sectional perspective view of the assembly in an assembled state.
Figure 5:
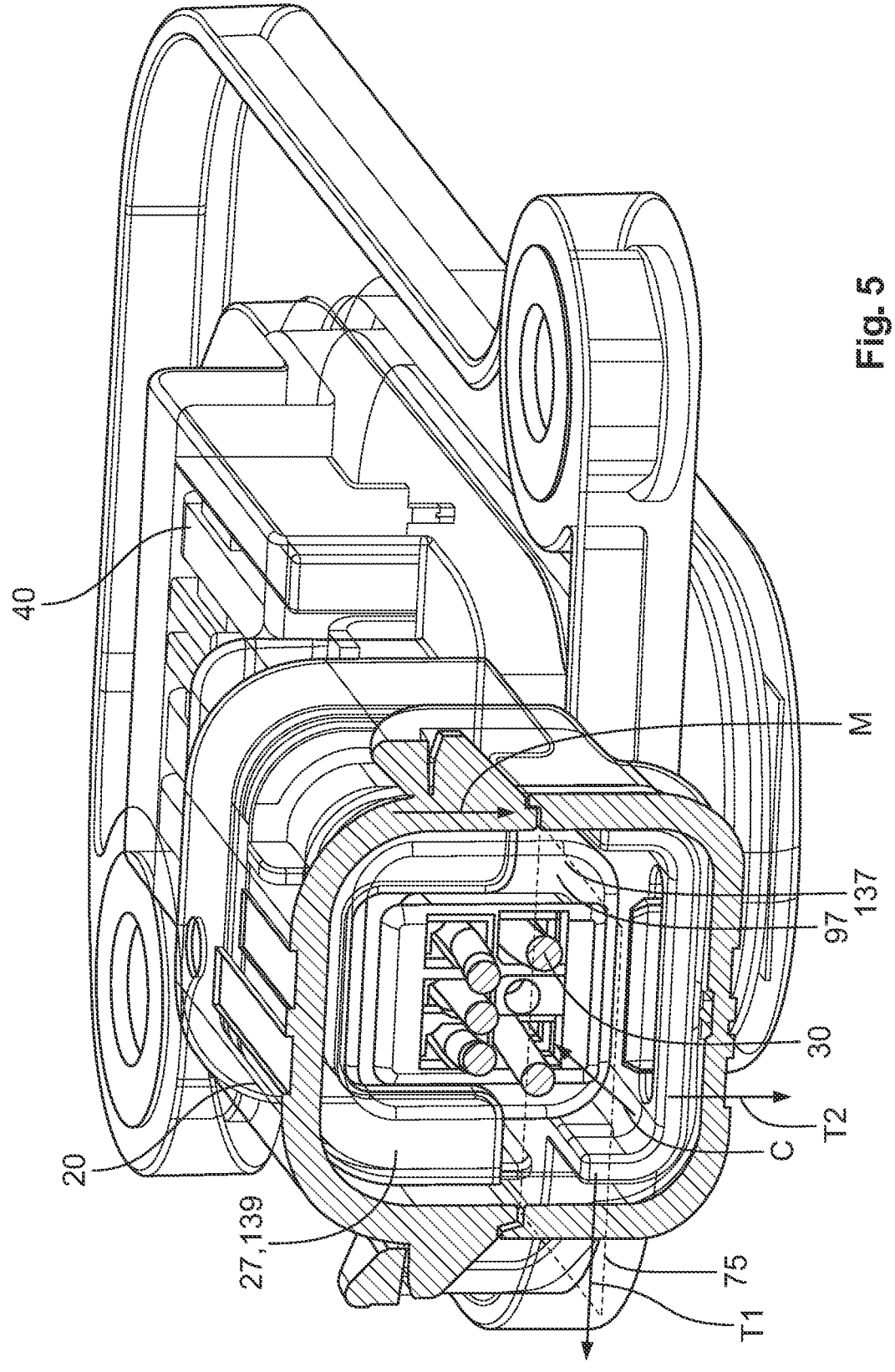
FIG. 5 is a sectional perspective view of the assembly in the assembled state from a different angle.

FIGS. 1 to 5 show a first embodiment of a cable protection cover 20 as part of an assembly 100. In FIGS. 1, 4 and 5, the assembly 100 is shown in an assembled state 101. Such an assembly 100 can, for example, be used in automobiles for measuring the rotational speed of an axle.

The assembly 100 comprises a sensor 41 with a housing 40. Instead of or in addition to the sensor 41, any other electrical device 138 with a housing 40, shown in FIG. 3, could be used as in the assembly 100 as well.

Into a connector interface 48 of the housing 40, an electric connector 50 can be plugged along a plugging direction P, as shown in FIG. 2. The connector interface 48 can be formed at least complementary to the connector 50. Further, the connector interface 48 can comprise openings for the terminals 53.

Cables 30 are fixed to the connector 50 through terminals 53 that are crimped onto the cables 30 and secured in corresponding cavities 54 by terminal latching elements 55 that are formed as deflectable arm-like elements, as shown in FIG. 4. This connection between the cables 30, the terminals 53, the connector 50 and the housing 40 can take up part of the pull-out forces that act when forces are applied to the cables 30 counter to a pull-out direction C, along which the cables 30 extend. However, as for smaller connectors, this connection might not provide a high enough pull-out force to comply with the relevant regulations, the cable protection cover 20 can take up further forces, as will be described below.

The cable protection cover 20 may comprise a tube attachment section 21 that serves for attaching a tube, such as a corrugated tube 10. The tube attachment section 21 may also be adapted to be used in combination with other tube types. Purely by way of example, the tube attachment section 21 of the shown exemplary embodiment is used in combination with a corrugated tube 10 and therefore has tube locking element 22 engaging the corrugations of the tube 10 that act as positive fit elements 92, as shown in FIGS. 3 and 4, the tube locking element 22 having a protrusion entering between ribs of the corrugated tube 10. The corrugated tube 10 is adapted for receiving the cables 30. Due to the corrugations, the tube 10 has a certain flexibility that allows a bending, while providing a stable inner volume for the cables 30. The corrugated tube 10 thus acts as a cable protection tube. Each cable 30 can comprise a core 31 made from an electrically conducting material like copper and an insulator 32 around the core 31.

At the other end of the cable protection cover 20, a housing attachment section 24 is present, as shown in FIG. 1. The housing attachment section 24 in particular comprises a positive fit arrangement 26 that protrudes inwards from a sidewall 25 and secures the cable protection cover 20 along the pull-out direction C by engaging a corresponding positive fit element 96 on the housing 40. The positive fit arrangement 26 on the cable protection cover 20 and the positive fit element 96 on the housing 40 are shaped as collars 44 that protrude perpendicular to the pull-out direction C from the rest of the cable protection cover 20 or the housing 40, respectively. The positive fit arrangement 26 has a double function, as it is located at an end and forms an end wall 29 of the cable protection cover 20. Such a solution can save space and weight. The collar 44 can extend around the cable 30 at least 40% of the circumference of the cable 30. The electric connector 50 is partially located in a receptacle 79 of the cable protection cover 20.

The cable protection cover 20 further comprises a connector lock 27 with at least one locking member 139 that secures the connector 50 against being pulled out from the housing 40 counter to the pull-out direction C, as shown in FIG. 4. Similar to the positive fit arrangement 26, the at least one locking member 139 of the connector lock 27 is also shaped as a collar 44 and protrudes inwards. It engages a corresponding positive fit element 97 on the connector 50.

The connector lock 27 protrudes from the same sidewall 25 as the positive fit arrangement 26. The positive fit arrangement 26 and the connector lock 27 are both integral with the side wall 25. The cable protection cover 20 can for example be made from a plastic material and be formed by injection molding to achieve such a configuration. The positive fit arrangement 26 and the connector lock 27 are both flat parts that protrude as walls or wall-like sections from the sidewall 25. They can extend basically perpendicular to the pull-out direction C. A dimension of the positive fit arrangement 26 and the connector lock 27 in the pull-out direction C can be less than the dimensions perpendicular to the pull-out direction C, in particular by a factor of at least three, or at least five. At least one of the positive fit arrangement 26 and the connector lock 27 can be part of a wall or formed as a wall. Such an embodiment can save space and weight while providing sufficient stability.

In an embodiment, the positive fit arrangement 26 and the at least one locking member of the connector lock 27 protrude from a common sidewall 25 of the cable protection cover 20. This can increase the stability of the cable protection cover 20. A particularly stable configuration can be achieved when at least one of the positive fit arrangement 26 and the at least one locking member of the connector lock 27 protrude perpendicularly from the common sidewall 25 of the cable protection cover 20. At least one of the positive fit arrangement 26 and the connector lock 27, and in an embodiment both, can advantageously be integral with the common sidewall 25 of the cable protection cover 20 to further increase stability.

Each of the cable protection covers 20 shown in the figures comprises another positive fit element 28, shown in FIG. 3, that creates a direct positive fit between the cable protection cover 20 and the housing 40 in and against the pull-out direction C by engaging a corresponding positive fit element 98 in the form of a through-hole in the housing 40. This indirectly strengthens the connection between the housing 40 and the connector 50.

The cable protection cover 20 acts as a cable protection cover that protects the cables 30 from external influences.

The two embodiments of the cable protection cover 20 shown in FIGS. 1 to 7 each comprise two parts 71, 72 that are connected to each other by a film hinge 73. This can facilitate the assembling process as two fitting parts are already connected and the step of looking for two fitting parts can be skipped. Further, it is not necessary to have two different feed lines for the two parts 71, 72.

Figure 8:
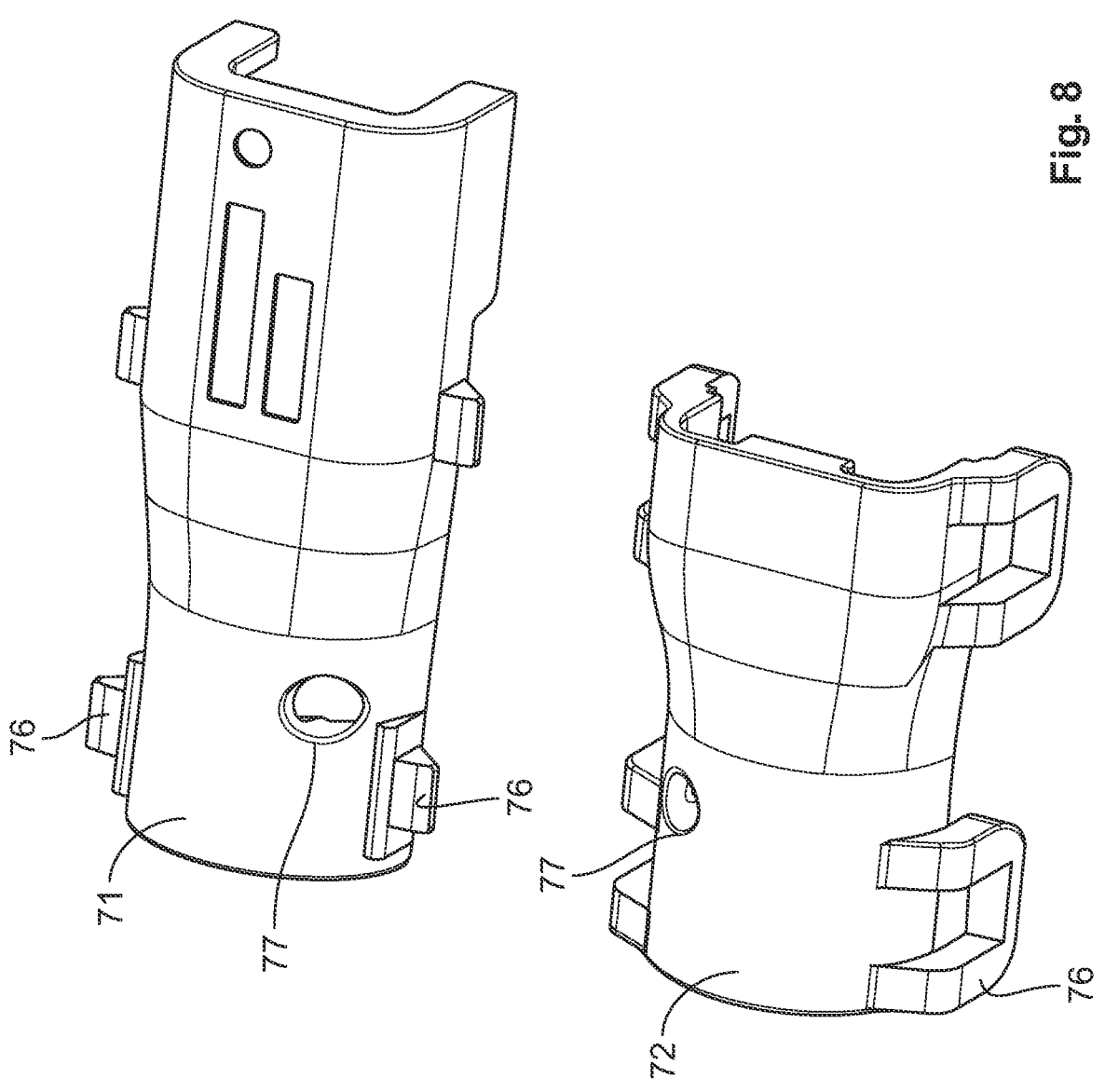
FIG. 8 is a perspective view of a cable protection cover according to a third embodiment.

However, as shown in the embodiment in FIG. 8, the cable protection cover 20 can also comprise two separate parts 71, 72. This has the advantage that different versions of cable protection covers 20 can be produced for example by mating one version of the first part 71 with different versions of the second part 72. In any case, the two parts 71,

72 are two part shells that, in combination with each other and the housing 40, form a closed shell. In other embodiments, the cable protection cover 20 could be only a single part.

In particular, at least one deflection wall 65 can be located on each part 71, 72. In such an embodiment, the cable 30 can be placed on one of the parts 71, 72. When the two parts 71, 72 are then mounted to each other, the deflection walls 65 will automatically deflect the cable 30.

As can for example be seen in FIG. 3, a separation plane 75 between the first part 71 and the second part 73 runs parallel to the pull-out direction C in the assembled state 101. The mounting of the cable protection cover 20 can be performed sideways and is thus simple. The separation plane 75 is further defined by a first transverse direction T1 that is perpendicular to the pull-out direction C. The first part 71 is attached to the second part 72 by latching elements 76.

The assembly 100 shown in FIG. 1 comprises a further connector 90 and a further cable protection cover 91 located at the other end of the tube 20. At this side, the assembly 100 can be attached to devices that receive the signals measured by the sensor 41. The further connector 90 can for example be connected to an engine control unit (ECU) and/or to another type of electrical device.

The connector 50 shown in the embodiment of FIGS. 1 to 5 comprises a first part 51 and a second part 52 that is engaged with the first part 51. In other embodiments, however, the connector 50 could comprise a single part only. Further, sealing elements 78 inhibit the ingress of dirt or fluids.

For further increasing the pull-out force, the embodiment shown in FIGS. 1 to 5 comprises a strain relief section 60 with at least one cable strain relief element 140. If the electric connector 50 itself has integrated strain relief, the strain relief section 60 of the cable protection could be used in addition or omitted. Said cable strain relief element 140 may be a deflection wall 65 protruding into a cavity 66 perpendicular to the pull-out direction C. The deflection wall 65 serves for bending the cables 30 perpendicular to the cable direction C and for thereby converting the pull-out force into deformation energy for deforming the cables 30. The deflection wall 65 bends the cables 30 along a second transverse direction T2 that is perpendicular to the pull-out direction C and perpendicular to the first transverse direction T1.

In an embodiment, the strain relief section 60 is located between the tube attachment section 21 and the housing attachment section 24. In order to be able to mechanically interact with the at least one cable 30, the strain relief section 60 may separate the tube attachment section 21, if present, from the housing attachment section 24. In particular, the strain relief section 60 may comprise a deflection zone, in which the cavity is U-, V- or W-shaped.

The cables 30 can enter the cavity 66 at an inlet 61 and exit the cavity 66 at an outlet 62. The deflection wall 65 intersects a direct connection volume 64 between the inlet 61 and the outlet 62, as shown in FIG. 4. In the depicted embodiment, the deflection wall 65 blocks the direct connection volume 64 entirely. Any abstract direct connection line between the inlet 61 and the outlet 62 extends through the deflection wall 65. The cable 30 is automatically bent and contacts the deflection wall 65. A pull-out force is thus increased due to friction and diversion of the force into the deflection wall 65.

The housing attachment section 24 and the tube attachment section 21, if present, may form the cavity 66 jointly with the strain relief section 60 as a continuous cavity to achieve a compact structure. The continuous cavity may extend through the cable protection cover 20, in particular, along the pull-out direction C.

The deflection wall 65 is located entirely on one of the two parts of the cable protection cover 20, namely on the first part 71. It is integral with the rest of the first part 71 and extends from a sidewall 25. The deflection of the cables 30 can be achieved automatically when the first part 71 is mounted onto the second part 72 in which the cables 30 are already located. The mounting direction M along which the first part 71 is mounted to the second part 72 can be parallel to the second transverse direction T2. The mounting direction M is perpendicular to the pull-out direction C.

To increase the mechanical stability of the cable protection cover 20, the deflection wall 65 is connected to the sidewalls 25 at at least 50% of the inner circumference of the cavity 66. In an embodiment, this value is at least 60%, or at least 70%. The deflection wall 65 blocks at least 60%, and in embodiments at least 70% or at least 80%, of the cross section of the cavity 66, wherein the cross section is taken perpendicular to the pull-out direction C.

In an embodiment, the deflection wall 65 is a continuous wall with no holes in it. The deflection wall 65 terminates in a straight edge extending from one side to another, which can avoid damage to the cable 30. The remaining opening between the deflection wall 65 and the opposing sidewall is about 2 to 4 times the thickness of one of the cables 30. For easy manufacturing, the deflection wall 65 can be integral with at least one sidewall of the cavity.

The wall defining the inlet 61 or the wall defining the outlet 62 can be seen as further deflection walls 65 that deflect the cables 30. Each of them can protrude perpendicular to the pull-out direction C from a sidewall 25. Two or more deflection walls 65 can be arranged such that they overlap along the pull-out direction C, that means that parts of them are behind each other when viewed along the pull-out direction C. This helps to increase the amount of bending in the cables 30 and thus to improve the pull-out force. Advantageously, when two deflection walls 65 are present, they protrude from different sides into the interior of the cable protection cover 20. In order to save space, the second deflection wall 65 can define the outlet or the inlet. Such a deflection wall then has a double function.

Each of the cable protection covers 20 comprises at least one inspection hole 77 through which the presence of the tube 10 is detectable from outside in the assembled state 101. Such a detection can for example be performed by a human or by a machine. The inspection through hole 77 may be directed into an interior of the tube attachment section 21. In particular, the inspection through hole 77 may extend substantially perpendicular to the direction of the continues cavity. A correct implementation of the assembly process can thereby be verified in a simple way.

Figure 6:
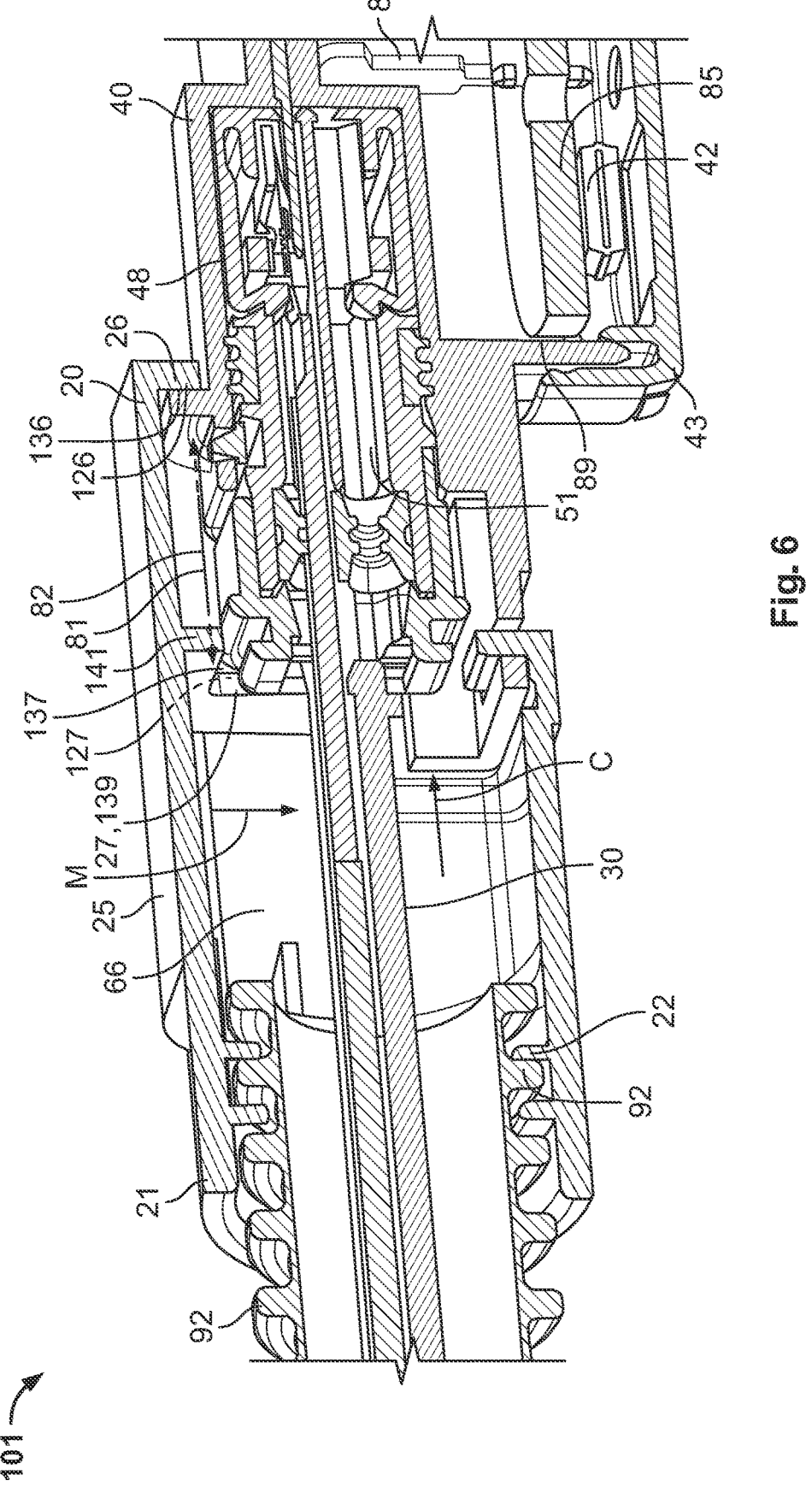
FIG. 6 is a sectional perspective view of an assembly with a second embodiment of a cable protection cover.

An advantageous development of the dimensions that is, however, also valid for the first embodiment of FIGS. 1 to 5, can for example be seen in FIG. 6 relating to the second embodiment. The distance 81 between opposing inner surfaces 126, 127 of the positive fit arrangement 26 and the connector lock 27 is equal to the distance 82 between corresponding outer surfaces 136, 137 on the housing 40 and the connector 50 in the assembled state 101. This allows a tight fit with no play. As a result, the pull-out forces can be increase efficiently. These distances 81, 82 are measured along the pull-out direction C.

The inner surfaces 126, 127 of the positive fit arrangement 26 and the connector lock 27 as well as the outer surfaces 136, 137 on the housing 40 and the connector 50 extend perpendicular to the pull-out direction C in the assembled state 101. Such an embodiment can be easy to manufacture, for example when the cable protection cover 20 is produced by injection molding.

If a slight pressing effect for pressing the connector 50 into the housing 40 is designed, the distance between the opposing inner surfaces 126, 127 of the positive fit arrangement 26 and the connector lock 27 should be slightly shorter than the distance 82 between corresponding outer surfaces 136, 137 on the housing 40 and the connector 50 in the assembled state.

In a further embodiment, at least one of the inner surfaces 126, 127 of the positive fit arrangement 26 or the connector lock 27 or outer surfaces 136, 137 on the housing 40 or the connector 50 is slightly tilted towards the pull-out direction C in order to achieve an automatic pressing of the connector 50 into the housing 40 during a mounting step.

The cable protection cover 20 also acts as a connector position assurance for the connector 50 in the housing 40. The cable protection cover 20 can only be attached when the connector 50 is plugged correctly into the housing 40, in particular when it has traveled the complete desired distance. For this purpose, the housing attachment section 24 may comprise at least one blocking protrusion 141 abutting the electric connector 50. In particular, the connector lock 27 may serve as the at least one blocking protrusion 141. Additionally or alternatively, the positive fit arrangement 26 may fulfill this function.

If the connector 50 is only plugged partially into the housing 40, the positive fit arrangement 26 and/or the connector lock 27 thus block a mounting of the cable protection cover 20 over the cables 30 by abutting surfaces along the second transverse direction T2. Moreover, a closing of the two parts 71, 72 of the cable protection cover 20 around at least one of the cable 30 and the electric connector 50 may be blocked by the electric connector 50 not fully mounted to the connector interface 48. This prevents errors during the installation of the electric connector 50.

In an embodiment, the electric connector 50 is arranged between the housing 40 and the at least one blocking protrusion 141, when it is in the assembled state. Otherwise, the at least one blocking protrusion 141 abuts the electric connector 50. Thus, the function of the connector position assurance may be achieved through the blocking protrusion 141, which advantageously also serves to secure the electric connector 50 to the housing 40.

In addition to the housing 40, the sensor 41 comprises a sensor element 42 for taking up the physical properties to be measured, a printed circuit board (PCB) 85 on which the sensor element 42 and further electrical elements, for example for signal processing, can be located, contact elements 88 that can connect the terminals 53 with the PCB 85, and a cover 42 that is permeable for the physical property to be measured. The cover 42 closes a receptacle 89 in which the PCB 85 is located. Mounting holes 49 serve for mounting the sensor 41 to external elements. The terminals 53 can be attached to the cables 30 by a crimping connection.

The assembly 100 is shown as comprising the sensor 41, the connector 50, the tube 10 and the cable protection cover 20. In other embodiments, the assembly 100 can comprise more or fewer elements, but at least one in addition to the cable protection cover 20. The connector 50 can comprise cavities for the terminals 53 and/or terminal latching elements for securing the terminals 53 in the connector 50.

The plugging direction P, along which the connector 50 is plugged into the housing 40, is parallel to the pull-out direction C. The terminals 53 can be inserted into the connector 50 along the pull-out direction C to make the assembly process easy.

Figure 7:
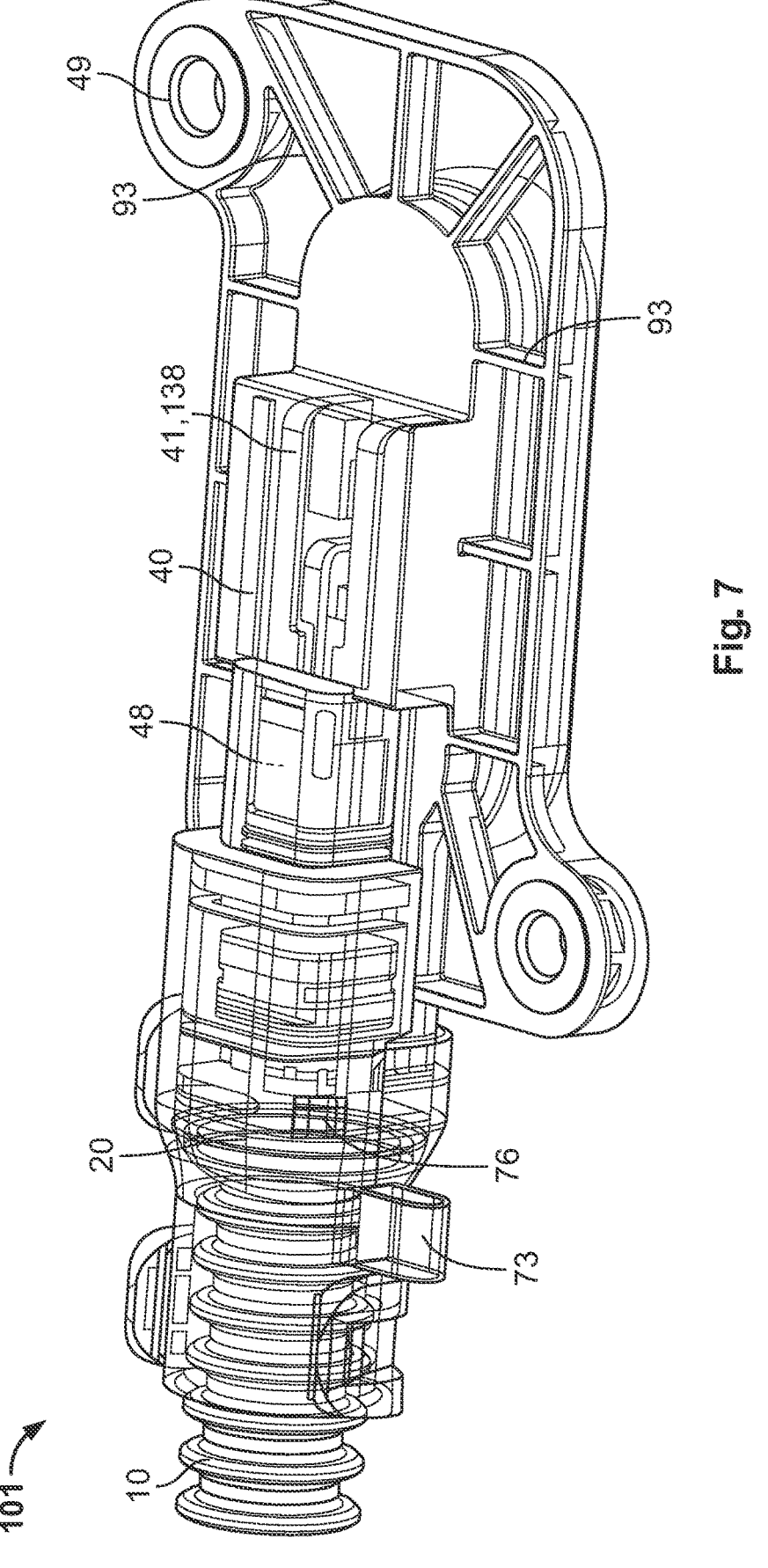
FIG. 7 is a perspective view of the assembly of FIG. 6.

The embodiment shown in FIGS. 6 and 7 does not comprise a deflection wall 65 for bending the cables 30. Rather, only an empty cavity 66 is formed between the tube attachment section 21 and the housing attachment section 24.

Further, the housing 40 shown in FIGS. 6 and 7 comprises support bars 93 to increase the stability.

What is claimed is:

1. A cable protection cover, comprising:
   a housing attachment section securing the cable protection cover to a housing of an electrical device and receiving an electric connector attached to the housing, the housing attachment section has a connector lock with a locking member restraining the electric connector in a pull-out direction in a position in which the electric connector is attached to the housing, the locking member protrudes inward and establishes a positive fit against the pull-out direction between the cable protection cover and the electric connector.

2. The cable protection cover of claim 1, further comprising a strain relief section receiving a cable of the electric connector, the strain relief section has a cable strain relief element.

3. The cable protection cover of claim 1, further comprising a tube attachment section engaging a cable tube surrounding a cable of the electric connector.

4. The cable protection cover of claim 3, wherein the tube attachment section has a tube locking element.

5. The cable protection cover of claim 4, wherein the cable tube is a corrugated tube and the tube locking element engages the corrugated tube.

6. The cable protection cover of claim 3, further comprising an inspection through hole extending to an interior of the tube attachment section.

7. The cable protection cover of claim 1, wherein the housing attachment section has a positive fit arrangement protruding inward and establishing a positive fit with the housing in an assembled state at least in the pull-out direction.

8. The cable protection cover of claim 7, wherein the positive fit arrangement and the locking member protrude from a common sidewall of the cable protection cover.

9. The cable protection cover of claim 1, wherein the cable protection cover is formed of a first part and a second part that are assembled in a direction perpendicular to the pull-out direction.

10. The cable protection cover of claim 9, wherein a separation plane between the first part and the second part is parallel to the pull-out direction.

11. The cable protection cover of claim 9, wherein the first part and the second part are connected by a film hinge.

12. The cable protection cover of claim 9, wherein the first part and the second part are separate from one another.

13. An assembly, comprising:
    a housing of an electrical device;
    an electric connector attached to the housing; and
    a cable protection cover including a housing attachment section securing the cable protection cover to the housing and receiving the electric connector, the housing attachment section has a connector lock with a locking member restraining the electric connector in a pull-out direction in a position in which the electric connector is attached to the housing.

14. The assembly of claim 13, wherein the housing has a connector interface connected to the electric connector.

15. The assembly of claim 14, wherein, in an assembled state, the connector interface and the electric connector are at least partly covered by the cable protection cover, the electric connector in the connector interface is blocked in the pull-out direction by the cable protection cover.

16. The assembly of claim 15, wherein the electric connector blocks a fixation of the cable protection cover to the housing if the electric connector is not fully mounted to the connector interface.

17. The assembly of claim 14, wherein the cable protection cover has a first part and a second part, a closing of the first part and the second part around at least one of a cable connected to the electric connector and the electric connector is blocked by the electric connector not fully mounted to the connector interface.

18. The assembly of claim 17, wherein the housing attachment section has a blocking protrusion abutting the electric connector, the electric connector is arranged between the housing and the blocking protrusion.

19. The assembly of claim 14, wherein the cable protection cover is a connector position assurance for the electric connector in the housing.

* * * * *